United States Patent
Goda (10) Patent No.: US 9,248,828 B2
(45) Date of Patent: Feb. 2, 2016

(54) VEHICLE AND VEHICLE CONTROL METHOD

(75) Inventor: Hideaki Goda, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 152 days.

(21) Appl. No.: 14/118,401

(22) PCT Filed: May 19, 2011

(86) PCT No.: PCT/JP2011/061474
§ 371 (c)(1),
(2), (4) Date: Nov. 18, 2013

(87) PCT Pub. No.: WO2012/157102
PCT Pub. Date: Nov. 22, 2012

(65) Prior Publication Data
US 2014/0088811 A1    Mar. 27, 2014

(51) Int. Cl.
| B60W 10/08 | (2006.01) |
| B60W 10/06 | (2006.01) |
| B60W 20/00 | (2006.01) |
| B60K 6/445 | (2007.10) |
| B60W 30/18 | (2012.01) |

(52) U.S. Cl.
CPC .............. *B60W 20/108* (2013.01); *B60K 6/445* (2013.01); *B60W 10/06* (2013.01); *B60W 10/08* (2013.01); *B60W 20/00* (2013.01); *B60W 30/18027* (2013.01); *B60W 2510/182* (2013.01); *B60W 2540/106* (2013.01); *B60W 2540/12* (2013.01); *B60W 2600/00* (2013.01); *B60W 2710/0661* (2013.01); *Y02T 10/6239* (2013.01); *Y02T 10/6286* (2013.01); *Y10S 903/93* (2013.01)

(58) Field of Classification Search
CPC ...... B60W 10/06; B60W 10/08; B60W 20/00
See application file for complete search history.

(56) References Cited

U.S. PATENT DOCUMENTS

| 2004/0038774 A1* | 2/2004 | Kuroda et al. ................ 477/3 |
| 2009/0143950 A1* | 6/2009 | Hasegawa et al. ........... 701/68 |
| 2010/0049387 A1 | 2/2010 | Aoki |
| 2010/0138086 A1* | 6/2010 | Imamura et al. ............. 701/22 |
| 2011/0035136 A1* | 2/2011 | Niimi ....................... 701/110 |
| 2011/0295474 A1* | 12/2011 | Ma et al. ..................... 701/58 |
| 2013/0325238 A1* | 12/2013 | Kato et al. .................. 701/22 |

FOREIGN PATENT DOCUMENTS

| JP | 2005-012874 A | 1/2005 |
| JP | 2006-138306 A | 6/2006 |
| JP | 2006-175943 A | 7/2006 |
| JP | 2008-056235 A | 3/2008 |
| JP | 2008-149964 A | 7/2008 |
| JP | 2008-168700 A | 7/2008 |
| JP | 2008-195143 A | 8/2008 |
| JP | 2009-161135 A | 7/2009 |
| JP | 2010-183733 A | 8/2010 |

* cited by examiner

*Primary Examiner* — Tisha Lewis
(74) *Attorney, Agent, or Firm* — Kenyon & Kenyon LLP (57) ABSTRACT

An ECU executes a program including the steps of adding a prescribed value when a brake pedal has been pressed down, calculating an amount of change in pressing force of the brake pedal, performing first motoring processing when the brake pedal has been released, adding a prescribed value to a brake OFF counter, calculating an amount of change in stroke when an accelerator pedal has been pressed down, calculating a first rate target value in accordance with a pedal switching speed, calculating a second rate target value in accordance with a speed of pressing-down of the accelerator pedal, determining a final rate target value, and controlling a first MG in accordance with the determined rate target value.

6 Claims, 8 Drawing Sheets

VEHICLE AND VEHICLE CONTROL METHOD

CROSS REFERENCE TO RELATED APPLICATION

This is a national phase application based on the PCT International Patent Application No. PCT/JP2011/061474 filed on May 19, 2011, the entire contents of which are incorporated herein by reference.

TECHNICAL FIELD

The present invention relates to control of an internal combustion engine and a rotating electric machine during re-acceleration of a hybrid vehicle.

BACKGROUND ART

Japanese Patent Laying-Open No. 2005-012874 (PTL 1) discloses a technique for applying engine brake by rotating an engine with a motor generator during deceleration of a vehicle.

CITATION LIST

Patent Literature

PTL 1: Japanese Patent Laying-Open No. 2005-012874

SUMMARY OF INVENTION

Technical Problem

During re-acceleration from a non-driven state of a hybrid vehicle, however, the number of revolutions of an engine is desirably increased with good responsiveness in accordance with a driver's intention for re-acceleration. The literature above does not disclose control of the number of revolutions of the engine from such a viewpoint during re-acceleration of a vehicle.

An object of the present invention is to provide a vehicle and a vehicle control method for increasing the number of revolutions of an engine with good responsiveness during re-acceleration from a non-driven state.

Solution to Problem

A vehicle according to one aspect of this invention includes an internal combustion engine serving as a drive source of a vehicle, a rotating electric machine for rotating an output shaft of the internal combustion engine, and a control unit for controlling the rotating electric machine so as to increase the number of revolutions of the internal combustion engine based on a velocity of the vehicle, while the vehicle is not driven. While the vehicle is not driven, the control unit increases a rate of increase in the number of revolutions as at least any one of a speed of pressing-down of an accelerator pedal and a speed of switching from a brake pedal to the accelerator pedal is higher, as compared with a rate of increase when the speed is low.

Preferably, the control unit determines a target value of the number of revolutions such that, as deceleration of the vehicle is higher, the number of revolutions of the internal combustion engine increased by the rotating electric machine becomes great, as compared with the number of revolutions when deceleration is low.

Further preferably, the control unit controls the rotating electric machine such that the number of revolutions increases to the target value when the brake pedal is released.

Further preferably, the vehicle further includes a drive shaft for rotating a drive wheel and a power transmission device capable of transmitting, by mechanically coupling three elements of the drive shaft, an output shaft of the internal combustion engine, and a rotation shaft of the rotating electric machine and setting any one of the three elements as a reaction force element, motive power between two other elements.

Further preferably, the power transmission device is a planetary gear mechanism having a sun gear, a pinion gear, a carrier, and a ring gear. The sun gear is coupled to the rotation shaft of the rotating electric machine. The carrier is coupled to the output shaft of the internal combustion engine. The ring gear is coupled to the drive shaft.

Further preferably, the vehicle further includes a power transmission device coupled between the rotating electric machine and a drive wheel. The power transmission device includes a clutch for switching a state between the rotating electric machine and the drive wheel between a power transmission state and a power cut-off state.

A vehicle control method according to another aspect of this invention is a vehicle control method used for a vehicle incorporating an internal combustion engine serving as a drive source and a rotating electric machine for rotating an output shaft of the internal combustion engine. The method includes the steps of, while the vehicle is not driven, increasing a rate of increase in the number of revolutions as at least any one of a speed of pressing-down of an accelerator pedal and a speed of switching from a brake pedal to the accelerator pedal is higher, as compared with a rate of increase when the speed is low, and controlling the rotating electric machine such that the number of revolutions of the internal combustion engine increases based on the rate of increase.

Advantageous Effects of Invention

According to this invention, by making setting such that a rate of increase in the number of revolutions increases as at least any one of a speed of switching from a brake pedal to an accelerator pedal and a speed of pressing-down of the accelerator pedal is higher, as compared with a rate of increase when the speed is low, the number of revolutions of an engine can be increased with good responsiveness to a driver's intention during re-acceleration. Therefore, a vehicle and a vehicle control method for increasing the number of revolutions of an engine with good responsiveness during re-acceleration from a non-driven state of the vehicle can be provided.

DESCRIPTION OF EMBODIMENTS

An embodiment of the present invention will be described hereinafter with reference to the drawings. In the description below, the same elements have the same reference characters allotted. Their label and function are also identical. Therefore, detailed description thereof will not be repeated.

An overall block diagram of a vehicle 1 according to the present embodiment will be described with reference to FIG. 1. Vehicle 1 includes an engine 10, a drive shaft 16, a first motor generator (hereinafter denoted as a first MG) 20, a second motor generator (hereinafter denoted as a second MG) 30, a power split device 40, a reduction gear 58, a PCU (Power Control Unit) 60, a battery 70, a drive wheel 80, a start switch 150, a braking device 151, and an ECU (Electronic Control Unit) 200.

This vehicle 1 runs with driving force output from at least one of engine 10 and second MG 30. Motive power generated by engine 10 is split into two paths by power split device 40. One path of the two paths is a path for transmission to drive wheel 80 through reduction gear 58, and the other path is a path for transmission to first MG 20.

First MG 20 and second MG 30 are each implemented, for example, by a three-phase AC rotating electric machine. First MG 20 and second MG 30 are driven by PCU 60.

First MG 20 has a function as a generator for generating electric power with motive power of engine 10 split by power split device 40 and for charging battery 70 with electric power through PCU 60. In addition, first MG 20 rotates a crankshaft which is an output shaft of engine 10, upon receiving electric power from battery 70. Thus, first MG 20 has a function as a starter for starting engine 10.

Second MG 30 has a function as a drive motor for providing driving force to drive wheel 80 by using at least any one of electric power stored in battery 70 and electric power generated by first MG 20. In addition, second MG 30 has a function as a generator for charging battery 70 through PCU 60 with electric power generated through regenerative braking.

Engine 10 is, for example, such an internal combustion engine as a gasoline engine or a diesel engine. Engine 10 includes a plurality of cylinders 102 and a fuel injector 104 for supplying fuel to each of the plurality of cylinders 102. Fuel injector 104 injects an appropriate amount of fuel at appropriate timing to each cylinder or stops injection of fuel to each cylinder based on a control signal S1 from ECU 200.

Engine 10 is provided with an engine rotation speed sensor 11 for detecting a rotation speed of a crankshaft of engine 10 (hereinafter denoted as an engine rotation speed). Engine rotation speed sensor 11 transmits a signal indicating detected engine rotation speed Ne to ECU 200.

Power split device 40 mechanically couples three elements of drive shaft 16 for rotating drive wheel 80, the output shaft of engine 10, and a rotation shaft of first MG 20 to one another. Power split device 40 allows, by setting any one of the three elements described above as a reaction force element, transmission of motive power between two other elements. A rotation shaft of second MG 30 is coupled to drive shaft 16.

Power split device 40 is a planetary gear mechanism including a sun gear 50, a pinion gear 52, a carrier 54, and a ring gear 56. Pinion gear 52 engages with each of sun gear 50 and ring gear 56. Carrier 54 rotatably supports pinion gear 52 and it is coupled to the crankshaft of engine 10. Sun gear 50 is coupled to the rotation shaft of first MG 20. Ring gear 56 is coupled to the rotation shaft of second MG 30 and reduction gear 58 with drive shaft 16 being interposed.

Reduction gear 58 transmits motive power from power split device 40 or second MG 30 to drive wheel 80. In addition, reduction gear 58 transmits reaction force from a road surface received by drive wheel 80 to power split device 40 or second MG 30.

PCU 60 converts DC power stored in battery 70 into AC power for driving first MG 20 and second MG 30. PCU 60 includes a converter and an inverter (neither of which is shown) controlled based on a control signal S2 from ECU 200. The converter steps up a voltage of DC power received from battery 70 and outputs the resultant voltage to the inverter. The inverter converts DC power output by the converter to AC power and outputs the resultant AC power to first MG 20 and/or second MG 30. Thus, first MG 20 and/or second MG 30 is/are driven by electric power stored in battery 70. In addition, the inverter converts AC power generated by first MG 20 and/or second MG 30 into DC power and outputs the resultant DC power to the converter. The converter steps down a voltage of the DC power output by the inverter and outputs the resultant voltage to battery 70. Thus, battery 70 is charged with electric power generated by first MG 20 and/or second MG 30. It is noted that it is not necessary to provide a converter.

Battery 70 is a power storage device and it is a rechargeable DC power supply. For example, such a secondary battery as a nickel metal hydride battery or a lithium ion battery is employed as battery 70. A voltage of battery 70 is, for example, approximately 200 V. As described above, battery 70 is charged with electric power generated by first MG 20 and/or second MG 30 and it may be charged with electric power supplied from an external power supply (not shown). It is noted that battery 70 is not limited to a secondary battery and it may be a component capable of generating a DC voltage, such as a capacitor, a solar cell, and a fuel cell.

Battery 70 is provided with a battery temperature sensor 156 for detecting a battery temperature TB of battery 70, a current sensor 158 for detecting a current IB of battery 70, and a voltage sensor 160 for detecting a voltage VB of battery 70.

Battery temperature sensor 156 transmits a signal indicating battery temperature TB to ECU 200. Current sensor 158 transmits a signal indicating current IB to ECU 200. Voltage sensor 160 transmits a signal indicating voltage VB to ECU 200.

Start switch 150 is, for example, a push-type switch. Start switch 150 may be such a switch that a key is inserted in a key cylinder and turned to a prescribed position. Start switch 150 is connected to ECU 200. In response to a driver's operation of start switch 150, start switch 150 transmits a signal ST to ECU 200.

For example, when ECU 200 receives signal ST while a system of vehicle 1 has stopped, ECU 200 determines that it has received an activation instruction and causes the system of vehicle 1 to make transition from a stop state to an active state. Alternatively, when ECU 200 receives signal ST while the system of vehicle 1 is in an active state, ECU 200 determines that it has received a stop instruction and causes the system of vehicle 1 to make transition from the active state to the stop state. In the description below, a driver's operation of start switch 150 while the system of vehicle 1 is in the active state is referred to as an IG OFF operation, and a driver's operation of start switch 150 while the system of vehicle 1 is in the stop state is referred to as an IG ON operation. When the system of vehicle 1 makes transition to the active state, electric power is supplied to a plurality of pieces of equipment necessary for vehicle 1 to run or the like and an operable state is set. On the other hand, when the system of vehicle 1 makes transition to the stop state, supply of electric power to some of the plurality of pieces of equipment necessary for vehicle 1 to run is stopped or the like and an operation stop state is set.

A first resolver 12 is provided in first MG 20. First resolver 12 detects a rotation speed Nm1 of first MG 20. First resolver 12 transmits a signal indicating detected rotation speed Nm1 to ECU 200.

A second resolver 13 is provided in second MG 30. Second resolver 13 detects a rotation speed Nm2 of second MG 30. Second resolver 13 transmits a signal indicating a detected rotation speed Nm2 to ECU 200.

A wheel speed sensor 14 detects a rotation speed Nw of drive wheel 80. Wheel speed sensor 14 transmits a signal indicating detected rotation speed Nw to ECU 200. ECU 200 calculates a velocity V of vehicle 1 based on received rotation speed Nw. It is noted that ECU 200 may calculate velocity V of vehicle 1 based on rotation speed Nm2 of second MG 30 instead of rotation speed Nw.

A brake pedal 166 is provided in a driver's seat. Brake pedal 166 is provided with a brake pedal pressing force sensor 168. Brake pedal pressing force sensor 168 detects a driver's pressing force Pb of brake pedal 166. Brake pedal pressing force sensor 168 transmits a signal indicating detected pressing force Pb to ECU 200. Brake pedal pressing force sensor 168 may detect, for example, a hydraulic pressure in a master cylinder coupled to brake pedal 166 as pressing force Pb. Alternatively, a stroke sensor for detecting an amount of pressing-down of brake pedal 166 may be employed instead of brake pedal pressing force sensor 168.

An accelerator pedal 170 is provided in the driver's seat. Accelerator pedal 170 is provided with a pedal stroke sensor 172. Pedal stroke sensor 172 detects an amount of stroke AP of accelerator pedal 170. Pedal stroke sensor 172 transmits a signal indicating amount of stroke AP to ECU 200. It is noted that an accelerator pedal pressing force sensor for detecting a driver's pressing force of accelerator pedal 170 may be employed instead of pedal stroke sensor 172.

Braking device 151 includes a brake actuator 152 and a disk brake 154. Disk brake 154 includes a brake disk that rotates integrally with a wheel and a brake caliper for restricting rotation of the brake disk by using a hydraulic pressure. The brake caliper includes brake pads provided to sandwich the brake disk in a direction in parallel to the rotation shaft and a wheel cylinder for transmitting a hydraulic pressure to the brake pad. Brake actuator 152 regulates a hydraulic pressure supplied to the wheel cylinder by regulating a hydraulic pressure generated by the driver's pressing-down of the brake pedal and a hydraulic pressure generated by using a pump, an electromagnetic valve, and the like, based on a control signal S3 received from ECU 200. Though FIG. 1 shows disk brake 154 only for a right rear wheel, disk brake 154 is provided for each wheel. Alternatively, a drum brake may be employed instead of disk brake 154.

ECU 200 generates control signal S1 for controlling engine 10 and outputs generated control signal S1 to engine 10. In addition, ECU 200 generates control signal S2 for controlling PCU 60 and outputs generated control signal S2 to PCU 60. Furthermore, ECU 200 generates control signal S3 for controlling brake actuator 152 and outputs generated control signal S3 to brake actuator 152.

By controlling engine 10, PCU 60, and the like, ECU 200 controls the entire hybrid system, that is, a state of charge and discharge of battery 70, and an operation state of engine 10, first MG 20, and second MG 30, such that vehicle 1 can most efficiently operate.

ECU 200 calculates requested driving force corresponding to an amount of pressing-down of the accelerator pedal (not shown) provided in the driver's seat. ECU 200 controls torque of first MG 20 and second MG 30 and output of engine 10 in accordance with calculated requested driving force.

In vehicle 1 having the construction as described above, when efficiency of engine 10 is bad at the time of start, during running at a low speed, or the like, running only with second MG 30 is carried out. Alternatively, during normal running, for example, power split device 40 splits motive power of engine 10 into two paths for motive power. Drive wheel 80 is directly driven by one motive power. Electric power is generated by driving first MG 20 with the other motive power. Here, ECU 200 causes second MG 30 to drive with the use of generated electric power. By thus driving second MG 30, drive of drive wheel 80 is assisted.

During deceleration of vehicle 1, second MG 30 following rotation of drive wheel 80 functions as a generator so that regenerative braking is carried out. Electric power recovered in regenerative braking is stored in battery 70. It is noted that ECU 200 increases an amount of electric power generated by first MG 20 by increasing output of engine 10 in the case where a remaining capacity of the power storage device (in the description below, denoted as SOC (State of Charge)) has lowered and charging is particularly required. SOC of battery 70 is thus raised. In addition, ECU 200 may carry out control for increasing driving force from engine 10 as necessary, even during running at a low speed. For example, a case where charging of battery 70 is required as described above, a case where auxiliary machinery such as an air-conditioner is driven, a case where a temperature of a coolant for engine 10 is raised to a prescribed temperature, and the like are exemplified.

In controlling an amount of charging of battery 70 and an amount of discharge therefrom, ECU 200 sets input electric power allowed during charging of battery 70 (in the description below, denoted as "charge power upper limit Win") and output electric power allowed during discharging from battery 70 (in the description below, denoted as "discharge power upper limit Wout") based on battery temperature TB and current SOC. For example, as the current SOC lowers, discharge power upper limit Wout is set to gradually lower. On the other hand, as the current SOC is higher, charge power upper limit Win is set to gradually lower.

A secondary battery employed as battery 70 has such temperature dependence that internal resistance increases when the temperature is low. When the temperature is high, excessive increase in temperature due to further heat generation should be prevented. Therefore, when battery temperature TB is low and high, each of discharge power upper limit Wout and charge power upper limit Win is preferably lowered. ECU 200 sets charge power upper limit Win and discharge power upper limit Wout, for example, by using a map or the like, in accordance with battery temperature TB and current SOC.

In vehicle 1 having the construction described above, during re-acceleration from a non-driven state (a state that accelerator pedal 170 has been released), the engine revolution number is desirably increased with good responsiveness in accordance with the driver's intention for re-acceleration.

Figure 2:
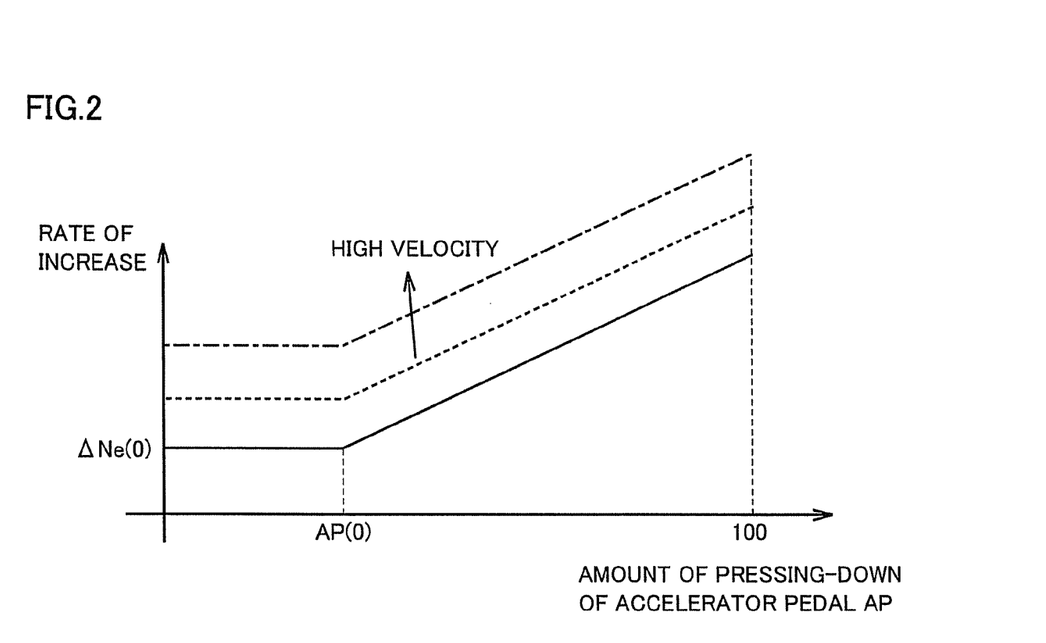
FIG. 2 is a diagram showing relation between an amount of stroke of an accelerator pedal and a rate of increase.

For example, a case where a rate of increase ΔNe in engine revolution number Ne is determined by using a map showing relation between amount of stroke AP of the accelerator pedal and rate of increase ΔNe as shown in FIG. 2 is assumed. The ordinate in FIG. 2 shows a rate of increase in engine revolution number Ne and the abscissa in FIG. 2 shows amount of stroke AP of accelerator pedal 170.

As shown with a solid line in FIG. 2, in such a state that accelerator pedal 170 has been released where amount of stroke AP is equal to or lower than a threshold value AP(0), a rate of increase in engine revolution number Ne attains to a prescribed value ΔNe(0). In such a state that amount of stroke AP is greater than threshold value AP(0), the rate of increase in engine revolution number Ne is determined to linearly increase with increase in amount of stroke AP.

In addition, as velocity V of vehicle 1 is higher, a map obtained by offsetting the map shown with the solid line in FIG. 2 to a position upward of the sheet surface (for example, maps shown with a dashed line and a chain dotted line in FIG. 2) is used, and as velocity V of vehicle 1 is lower, a map obtained by offsetting the map shown with the solid line in FIG. 2 to a position downward of the sheet surface is used.

Therefore, while vehicle 1 is not driven, a value lower than the rate of increase determined in the case where accelerator pedal 170 is pressed down is determined as rate of increase ΔNe in engine revolution number Ne. In particular when deceleration ΔV of vehicle 1 is great, velocity V of vehicle 1 lowers and hence a map obtained by offsetting the map shown with the solid line in FIG. 2 to a position downward of the sheet surface is used. Consequently, rate of increase ΔNe in the case where deceleration ΔV is great is determined to a value lower than in the case where deceleration ΔV is small.

Therefore, in the case where vehicle 1 is not driven and deceleration ΔV is great, even though re-acceleration is requested by pressing down accelerator pedal 170 or the like, responsiveness in increase in engine revolution number Ne may become poor.

Then, the feature of the present embodiment resides in that, while vehicle 1 is not driven, as any one of a speed of pressing-down of accelerator pedal 170 and a speed of switching from brake pedal 166 to accelerator pedal 170 is higher, ECU 200 increases rate of increase ΔNe in engine revolution number Ne, as compared with a rate of increase when the speed is low.

Figure 3:
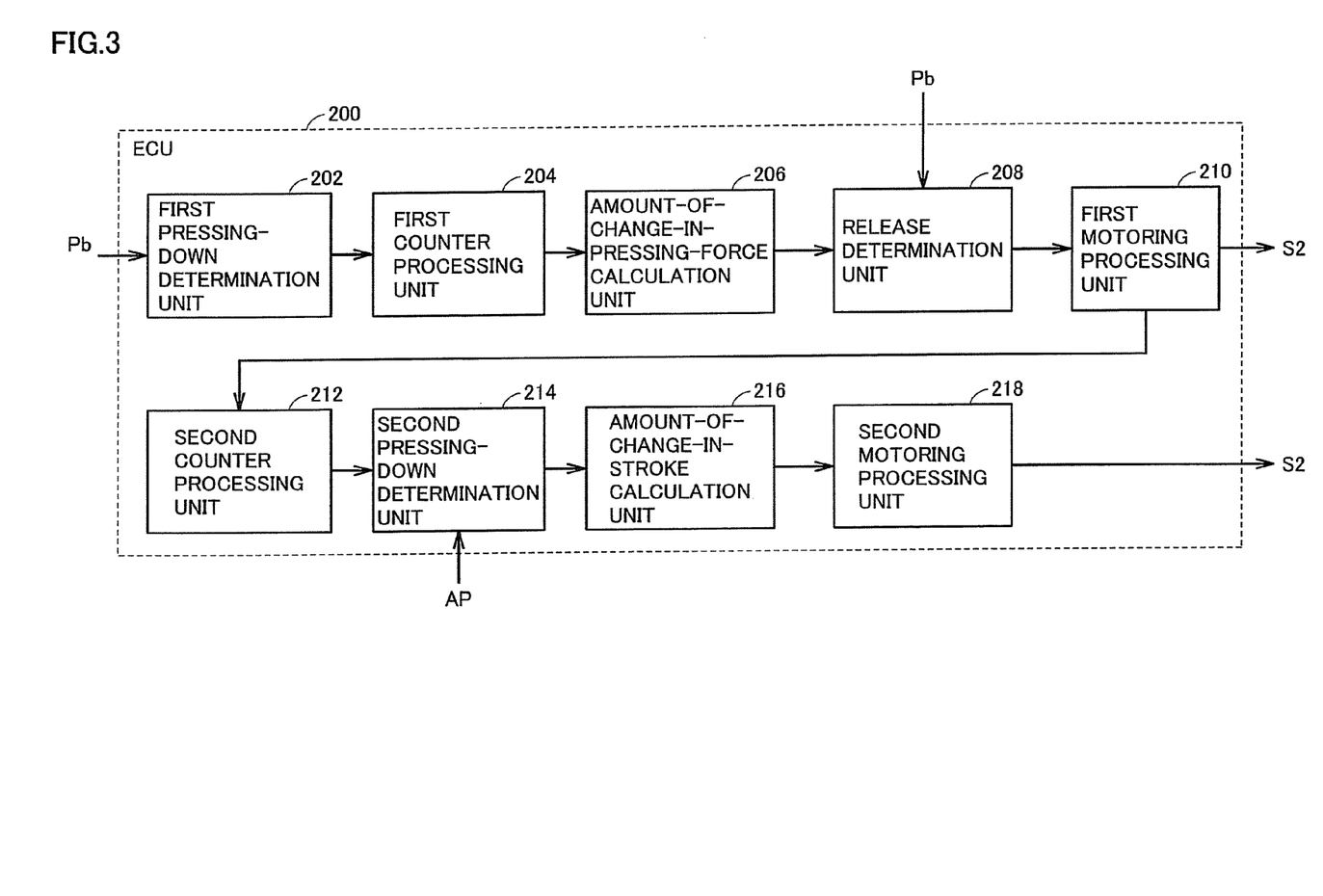
FIG. 3 is a functional block diagram of an ECU mounted on the vehicle according to the present embodiment.

FIG. 3 shows a functional block diagram of ECU 200 mounted on vehicle 1 according to the present embodiment. ECU 200 includes a first pressing-down determination unit 202, a first counter processing unit 204, an amount-of-change-in-pressing-force calculation unit 206, a release determination unit 208, a first motoring processing unit 210, a second counter processing unit 212, a second pressing-down determination unit 214, an amount-of-change-in-stroke calculation unit 216, and a second motoring processing 218.

First pressing-down determination unit 202 determines whether or not the driver presses down brake pedal 166. For example, when pressing force Pb of brake pedal 166 is greater than a threshold value Pb(0), first pressing-down determination unit 202 determines that the driver presses down brake pedal 166.

It is noted that, for example, when it is determined that the driver presses down brake pedal 166, first pressing-down determination unit 202 may set a brake pressing-down determination flag to ON.

When first pressing-down determination unit 202 has determined that the driver presses down brake pedal 166, first counter processing unit 204 adds a prescribed value ΔCb_on to a count value Cb_on of a brake ON counter.

It is noted that, for example, when the brake pressing-down determination flag is ON, first counter processing unit 204 may add prescribed value ΔCb_on to count value Cb_on.

In addition, when first pressing-down determination unit 202 has determined that the driver presses down brake pedal 166, first counter processing unit 204 clears a count value Cb_off of a brake OFF counter and resets the count value to an initial value Cb_off(0). Initial value Cb_off(0) is, for example, zero.

Amount-of-change-in-pressing-force calculation unit 206 calculates an amount of change ΔPb in pressing force Pb of brake pedal 166 per unit time. Amount-of-change-in-pressing-force calculation unit 206 calculates amount of change ΔPb in pressing force Pb per unit time, for example, based on current pressing force Pb of brake pedal 166, pressing force Pb' at the time point when count value Cb_on is at initial value Cb_on(0), and a brake ON time period Tb calculated from current count value Cb_on. Specifically, amount-of-change-in-pressing-force calculation unit 206 calculates amount of change ΔPb by using an equation of ΔPb=(Pb−Pb')/Tb. It is noted that amount-of-change-in-pressing-force calculation unit 206 may calculate amount of change ΔPb in pressing force Pb per unit time based on current pressing force Pb and pressing force Pb" prescribed time ago.

Release determination unit 208 determines whether or not the driver has released brake pedal 166. For example, when pressing force Pb of brake pedal 166 is smaller than a threshold value Pb(1), release determination unit 208 determines that the driver has released brake pedal 166. Threshold value Pb(1) should only be a value equal to or smaller than threshold value Pb(0) described above.

It is noted that, when release determination unit 208 determines that the driver has released brake pedal 166, it may set a brake release determination flag to ON.

When release determination unit 208 determines that the driver has released brake pedal 166, first motoring processing unit 210 performs first motoring processing. Specifically, first motoring processing unit 210 performs processing for causing first MG 20 to increase engine revolution number Ne to a revolution number target value Ne_ta. Here, first motoring processing unit 210 determines revolution number target value Ne_ta of engine revolution number Ne based on deceleration ΔV of vehicle 1.

First motoring processing unit 210 may calculate deceleration ΔV of vehicle 1 based on velocity V of vehicle 1. In the present embodiment, first motoring processing unit 210 calculates deceleration ΔV of vehicle 1 based on amount of change ΔPb in pressing force Pb of brake pedal 166 per unit time and on a prescribed map. The prescribed map is set, for example, such that, as amount of change ΔPb is greater, calculated deceleration ΔV is greater than deceleration when amount of change ΔPb is small.

It is noted that first motoring processing unit 210 may calculate as deceleration ΔV of vehicle 1, an amount of change over time of velocity V of vehicle 1 while vehicle 1 is not driven. Alternatively, first motoring processing unit 210 may directly detect deceleration ΔV of vehicle 1 by using a G sensor or the like.

Figure 4:
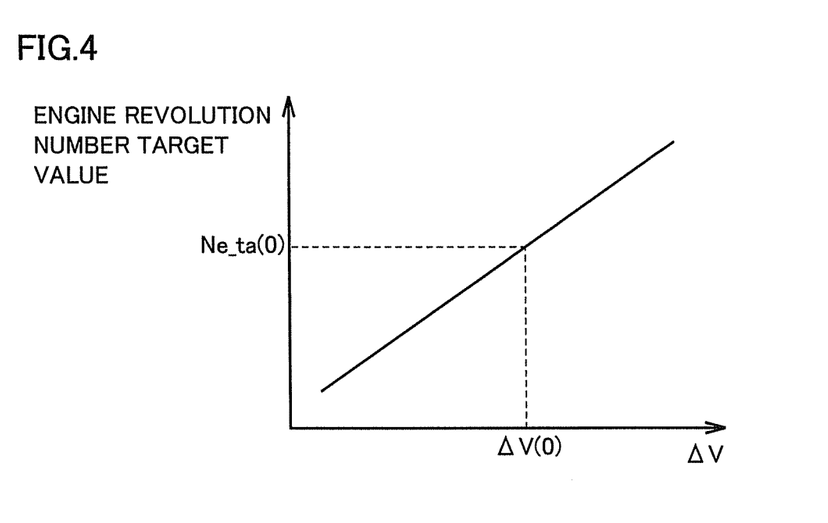
FIG. 4 is a diagram showing relation between a target value of an engine revolution number and deceleration.

First motoring processing unit 210 may determine revolution number target value Ne_ta, for example, based on calculated deceleration ΔV and a map shown in FIG. 4. The ordinate in FIG. 4 shows revolution number target value Ne_ta and the abscissa in FIG. 4 shows deceleration ΔV of vehicle 1.

For example, when calculated deceleration is ΔV(0), first motoring processing unit 210 may use the map shown in FIG. 4 to determine revolution number target value Ne_ta(0). In the map shown in FIG. 4, relation between deceleration ΔV and revolution number target value Ne_ta is set such that, as deceleration ΔV is greater, revolution number target value Ne_ta increases, as compared with a revolution number target value when deceleration ΔV is small.

It is noted that relation between deceleration ΔV and revolution number target value Ne_ta is not particularly limited to linear relation as shown in the map shown in FIG. 4. Relation between deceleration ΔV and revolution number target value Ne_ta may be, for example, non-linear. In addition, a table, an equation, and the like may be used instead of the map shown in FIG. 4.

First motoring processing unit 210 causes first MG 20 to increase engine revolution number Ne to revolution number target value Ne_ta in accordance with a prescribed rate of increase ΔNe(0). It is noted that first motoring processing unit 210 may determine rate of increase ΔNe based on deceleration ΔV. Alternatively, first motoring processing unit 210 may determine rate of increase ΔNe based on a velocity of vehicle 1, amount of stroke AP of accelerator pedal 170, and the map shown in FIG. 2.

When engine revolution number Ne has attained to revolution number target value Ne_ta, first motoring processing unit 210 controls first MG 20 such that engine revolution number Ne maintains revolution number target value Ne_ta. First motoring processing unit 210 carries out feedback control of first MG 20, for example, based on a difference between engine revolution number Ne and revolution number target value Ne_ta.

It is noted that first motoring processing unit 210 may perform the first motoring processing, for example, when the brake release determination flag is ON. In addition, when a prescribed period of time has elapsed since release of brake pedal 166, first motoring processing unit 210 may end the first motoring processing.

Second counter processing unit 212 clears count value Cb_on of the brake ON counter and resets the count value to initial value Cb_on(0). Initial value Cb_on(0) is, for example, zero. In addition, second counter processing unit 212 adds a prescribed value ΔCb_off to a count value Cb_off. It is noted that, for example, when the brake release determination flag is ON, second counter processing unit 212 may add prescribed value ΔCb_off to count value Cb_off while clearing count value Cb_on and resetting the count value to initial value Cb_on(0).

Second pressing-down determination unit 214 determines whether or not the driver presses down accelerator pedal 170 while the first motoring processing is being performed. For example, when amount of stroke AP of accelerator pedal 170 is greater than threshold value AP(0), second pressing-down determination unit 214 determines that the driver presses down accelerator pedal 170. It is noted that, for example, when second pressing-down determination unit 214 has determined that the driver presses down accelerator pedal 170, it may set an accelerator pressing-down determination flag to ON.

Amount-of-change-in-stroke calculation unit 216 calculates amount of change ΔAP in amount of stroke AP of accelerator pedal 170 per unit time. Amount-of-change-in-stroke calculation unit 216 calculates amount of change ΔAP in amount of stroke AP per unit time, for example, based on current amount of stroke AP of accelerator pedal 170 and a time period Ta for which accelerator pedal 170 is pressed down. Specifically, amount-of-change-in-stroke calculation unit 216 calculates amount of change ΔAP in amount of stroke AP by using an equation of ΔAP=AP/Ta.

Second motoring processing unit 218 calculates a first rate target value ΔNe_a of engine revolution number Ne in accordance with a speed of switching ΔTba from brake pedal 166 to accelerator pedal 170. Second motoring processing unit 218 calculates as pedal switching speed ΔTba, a time period from the driver's release of brake pedal 166 until the driver's pressing down of accelerator pedal 170.

Second motoring processing unit 218 calculates pedal switching speed ΔTba based on count value Cb_off of the brake OFF counter. Second motoring processing unit 218 calculates first rate target value ΔNe_a, for example, based on calculated pedal switching speed ΔTba and on a map.

Figure 5:
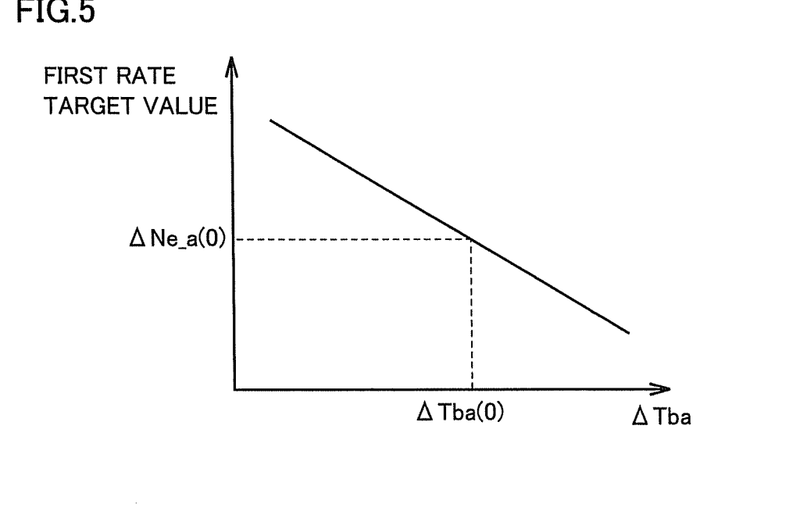
FIG. 5 is a diagram showing relation between a pedal switching speed and a first rate target value.

The map is a map showing relation between pedal switching speed ΔTba and first rate target value ΔNe_a as shown in FIG. 5. The ordinate in FIG. 5 shows first rate target value ΔNe_a and the abscissa in FIG. 5 shows pedal switching speed ΔTba.

In the map shown in FIG. 5, relation between pedal switching speed ΔTba and first rate target value ΔNe_a is set such that first rate target value ΔNe_a increases as pedal switching speed ΔTba is lower, as compared with a first rate target value when pedal switching speed ΔTba is high. For example, when the pedal switching speed is at ΔTba(0), second motoring processing unit 218 calculates a first rate target value ΔNe_a(0) from the map shown in FIG. 5.

Second motoring processing unit 218 further calculates a second rate target value ΔNe_b based on a speed of pressing-down of accelerator pedal 170. Specifically, second motoring processing unit 218 calculates as a speed of pressing-down of accelerator pedal 170, amount of change ΔAP calculated by amount-of-change-in-stroke calculation unit 216, and calculates second rate target value ΔNe_b based on calculated amount of change ΔAP.

Second motoring processing unit 218 calculates second rate target value ΔNe_b, for example, based on amount of change ΔAp calculated by amount-of-change-in-stroke calculation unit 216 and on a map.

Figure 6:
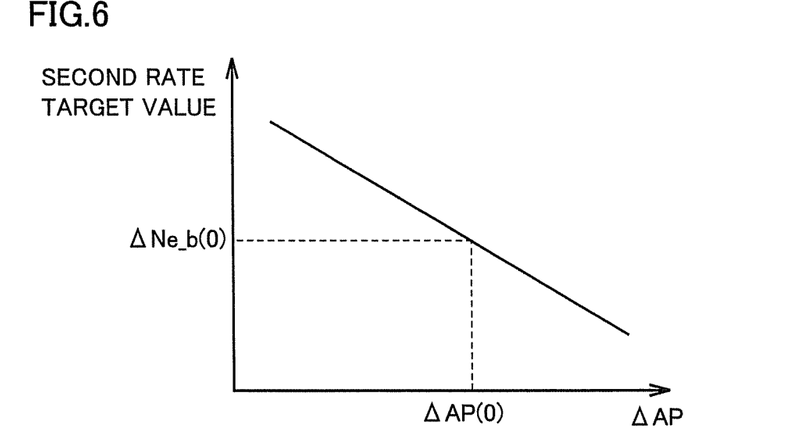
FIG. 6 is a diagram showing relation between a speed of pressing-down and a second rate target value.

The map is a map showing relation between amount of change ΔAP and second rate target value ΔNe_b as shown in FIG. 6. The ordinate in FIG. 6 shows second rate target value ΔNe_b and the abscissa in FIG. 6 shows amount of change ΔAP in amount of stroke AP of accelerator pedal 170.

In the map shown in FIG. 6, relation between amount of change ΔAP and second rate target value ΔNe_b is set such that second rate target value ΔNe_b increases as amount of change ΔAP is smaller, as compared with a second rate target value when amount of change ΔAP is great.

For example, when amount of change ΔAP is at ΔAP(0), second motoring processing unit 218 calculates a second rate target value ΔNe_b(0) from the map shown in FIG. 6.

Second motoring processing unit 218 determines a final rate target value ΔNe_t of rate of increase ΔNe based on first rate target value ΔNe_a and second rate target value ΔNe_b. Second motoring processing unit 218 determines as rate target value ΔNe_t, for example, the sum of first rate target value ΔNe_a and second rate target value ΔNe_b.

Second motoring processing unit 218 controls first MG 20 such that engine revolution number Ne increases in accordance with determined rate target value ΔNe_t. Second motoring processing unit 218 controls first MG 20 such that engine revolution number Ne increases up to a revolution number target value Ne_tb determined based on amount of stroke AP of accelerator pedal 170. Second motoring processing unit 218 calculates revolution number target value Ne_tb, for example, by using a prescribed map showing relation between amount of stroke AP and revolution number target value Ne_tb. The prescribed map is set, for example, such that, when amount of stroke AP is great, revolution number target value Ne_tb is higher than a revolution number target value when amount of stroke AP is small.

In the present embodiment, first pressing-down determination unit 202, first counter processing unit 204, amount-of-change-in-pressing-force calculation unit 206, release determination unit 208, first motoring processing unit 210, second counter processing unit 212, second pressing-down determination unit 214, amount-of-change-in-stroke calculation unit 216, and second motoring processing unit 218 are each described as functioning as software implemented by execution by a CPU in ECU 200, of a program stored in a memory, however, they may be implemented by hardware. It is noted that such a program is mounted on a vehicle as recorded in a storage medium.

Figure 7:
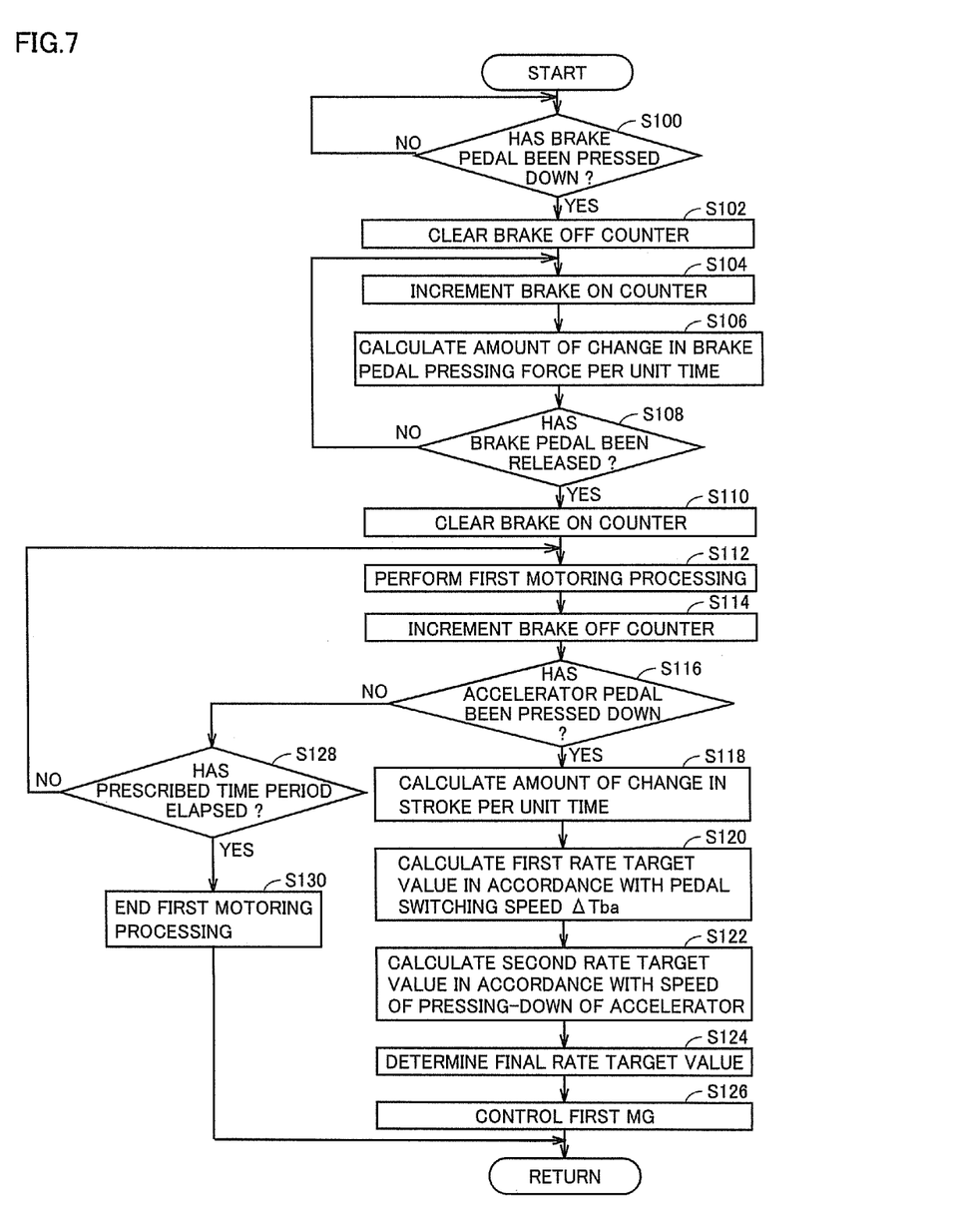
FIG. 7 is a flowchart showing a control structure of a program executed by the ECU mounted on the vehicle according to the present embodiment.

A control structure of a program executed by ECU 200 mounted on vehicle 1 according to the present embodiment will be described with reference to FIG. 7.

In step (a step will hereinafter be denoted as S) 100, ECU 200 determines whether or not the driver has pressed down brake pedal 166. When it is determined that the driver has pressed down brake pedal 166 (YES in S100), the process proceeds to S102. Otherwise (NO in S100), the process returns to S100.

In S102, ECU 200 clears count value Cb_off of the brake OFF counter and resets the count value to initial value Cb_off (0). In S104, ECU 200 adds prescribed value ΔCb_on to count value Cb_on of the brake ON counter. In S106, ECU 200 calculates amount of change ΔPb in pressing force Pb of brake pedal 166 per unit time.

In S108, ECU 200 determines whether or not the driver has released brake pedal 166. When it is determined that the driver has released brake pedal 166 (YES in S108), the process proceeds to S110. Otherwise (NO in S108), the process returns to S104.

In S110, ECU 200 clears count value Cb_on of the brake ON counter and resets the count value to initial value Cb_on (0). In S112, ECU 200 performs the first motoring processing. Since the first motoring processing is as described above, detailed description thereof will not be repeated. In S114, ECU 200 adds prescribed value ΔCb_off to count value Cb_off of the brake OFF counter.

In S116, ECU 200 determines whether or not the driver has pressed down accelerator pedal 170. When it is determined that the driver has pressed down accelerator pedal 170 (YES in S116), the process proceeds to S118. Otherwise (NO in S116), the process proceeds to S128.

In S118, ECU 200 calculates amount of change ΔAP in amount of stroke AP of accelerator pedal 170 per unit time. In S120, ECU 200 calculates first rate target value ΔNe_a in accordance with speed of switching ΔTba from brake pedal 166 to accelerator pedal 170. In S122, ECU 200 determines second rate target value ΔNe_b in accordance with the speed of pressing-down of accelerator pedal 170 (that is, amount of change ΔAP in amount of stroke AP).

In S124, ECU 200 determines final rate target value ΔNe_t of rate of increase ΔNe. In S126, ECU 200 controls first MG 20 such that engine revolution number Ne increases up to revolution number target value Ne_b in accordance with determined rate target value ΔNe_t.

In S128, ECU 200 determines whether or not a prescribed time period or longer has elapsed since release of brake pedal 166. When a prescribed time period or longer has elapsed since release of brake pedal 166 (YES in S128), the process proceeds to S130. Otherwise (NO in S128), the process proceeds to S112. In S130, ECU 200 ends the first motoring processing.

An operation of ECU 200 mounted on vehicle 1 according to the present embodiment based on the structure and the flowchart as above will be described with reference to FIG. 8.

Figure 8:
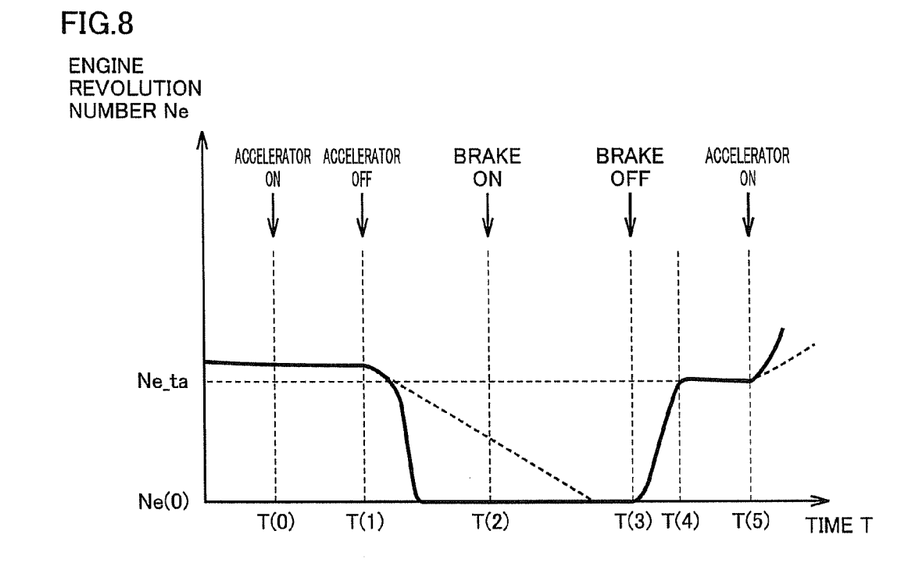
FIG. 8 is a timing chart for illustrating an operation of the ECU mounted on the vehicle according to the present embodiment.

As shown with a solid line in FIG. 8, a case where, after accelerator pedal 170 is pressed down at a time T(0), accelerator pedal 170 is released at a time T(1) is assumed.

When accelerator pedal 170 is released at time T(1), fuel cut control is carried out and hence engine revolution number Ne is lowered to the number of revolutions Ne(0). The number of revolutions Ne(0) is, for example, zero. Therefore, engine revolution number Ne is lowered to the number of revolutions Ne(0) more quickly than when an amount of change in the number of revolutions of engine 10 is determined based on velocity V of vehicle 1 and amount of stroke AP of accelerator pedal 170 (a dashed line in FIG. 8).

When brake pedal 166 is pressed down at a time T(2) (YES in S100), braking device 151 is activated and braking force is applied to vehicle 1. Consequently, deceleration ΔV of vehicle 1 increases. In addition, here, count value Cb_off of the brake OFF counter is reset to the initial value (S102).

While brake pedal 166 is being pressed down, prescribed value ΔCb_on is added to count value Cb_on of the brake ON counter every calculation cycle (S104) and amount of change ΔPb in pressing force Pb of brake pedal 166 per unit time is calculated (S106).

When brake pedal 166 is released at a time T(3) (YES in S108), ECU 200 performs the first motoring processing (S112) while resetting count value Cb_on of the brake ON counter to the initial value (S110).

ECU 200 calculates revolution number target value Ne_ta of engine revolution number Ne based on deceleration ΔV of vehicle 1 calculated from amount of change ΔPb of pressing force Pb at time T(3). ECU 200 controls first MG 20 such that engine revolution number Ne increases up to calculated revolution number target value Ne_ta. ECU 200 controls first MG 20 such that engine revolution number Ne increases in accordance with prescribed rate of increase ΔNe(0). When engine revolution number Ne has attained to revolution number target value Ne_ta, ECU 200 controls first MG 20 such that engine revolution number Ne is maintained at target value Ne_ta.

In addition, during the first motoring processing until accelerator pedal 170 is pressed down (NO in S116), ECU 200 adds prescribed value ΔCb_off to count value Cb_off of the brake OFF counter every calculation cycle (S114).

When the driver of vehicle 1 presses down accelerator pedal 170 at a time T(4) (YES in S116), amount of change ΔAP in amount of stroke AP per unit time is calculated (S118). Further, first rate target value ΔNe_a in accordance with speed of switching ΔTba from brake pedal 166 to accelerator pedal 170 and second rate target value ΔNe_b in accordance with amount of change ΔAP are calculated (S120, S122). Then, final rate target value ΔNe_t of rate of increase ΔNe is calculated from the sum of calculated first rate target value ΔNe_a and second rate target value ΔNe_b (S124).

Consequently, first MG 20 is controlled such that engine revolution number Ne increases in accordance with calculated rate target value ΔNe_t (S126). In the case where the speed of pressing-down of accelerator pedal 170 is the same, calculated rate target value ΔNe_t is greater than rate target value ΔNe_t(0) (the dashed line in FIG. 8) calculated when pedal switching speed ΔTba is greater than T(3)−T(2).

Alternatively, in the case where pedal switching speed ΔTba is the same, calculated rate target value ΔNe_t is greater than a rate target value ΔNe_t(1) calculated at the time when a speed of pressing-down of accelerator pedal 170 is low.

As described above, according to the vehicle in the present embodiment, setting is made such that, as any one of speed of switching ΔTba from brake pedal 166 to accelerator pedal 170 and the speed of pressing-down of accelerator pedal 170 is higher, rate of increase ΔNe increases as compared with a rate of increase when the speed is low. Thus, engine revolution number Ne can be increased with good responsiveness to a driver's intention during re-acceleration. In particular, as the target value of rate of increase ΔNe at the time when accelerator pedal 170 is pressed down is greater than rate of increase ΔNe of engine revolution number Ne in the case where brake pedal 166 is turned off, engine revolution number Ne can be increased with good responsiveness. Therefore, a vehicle and a vehicle control method for increasing the number of revolutions of an engine with good responsiveness during re-acceleration from a non-driven state of vehicle 1 can be provided.

In addition, by performing the first motoring processing at the time point when brake pedal 166 is released, which is later than the time point when accelerator pedal 170 is turned off, unnecessary use of first MG 20 for rotating the output shaft of engine 10 is suppressed. Consequently, deterioration in fuel efficiency can be suppressed.

Though ECU 200 has been described as determining the sum of first rate target value ΔNe_a and second rate target value ΔNe_b as final rate target value ΔNe_t in the present embodiment, a method of determining rate target value ΔNe_t is not particularly limited to such a method.

For example, ECU 200 may determine a value calculated by multiplying first rate target value ΔNe_a by second rate target value ΔNe_b as final rate target value ΔNe_t.

Alternatively, ECU 200 may calculate a first correction coefficient from a speed of pressing-down of accelerator pedal 170 and then determine a value calculated by multiplying first rate target value ΔNe_a by the first correction coefficient as final rate target value ΔNe_t. Alternatively, ECU 200 may calculate a second correction coefficient from pedal switching speed ΔTba and determine a value calculated by multiplying second rate target value ΔNe_b by the second correction coefficient as final rate target value ΔNe_t.

Alternatively, ECU 200 may calculate a first correction coefficient and a second correction coefficient and determine a value calculated by multiplying an initial value by the first correction coefficient and the second correction coefficient as final rate target value ΔNe_t. It is noted that the initial value may be a prescribed value or a value determined based on a velocity or the like of vehicle 1.

Though it has been described in the present embodiment that engine revolution number Ne is lowered to the number of revolutions Ne(0) in the case where accelerator pedal 170 is released, the number of revolutions Ne(0) is not limited to zero. The number of revolutions Ne(0) may be, for example, the number of revolutions corresponding to an idle state of engine 10 or a value determined in accordance with a state of vehicle 1.

Figure 1:
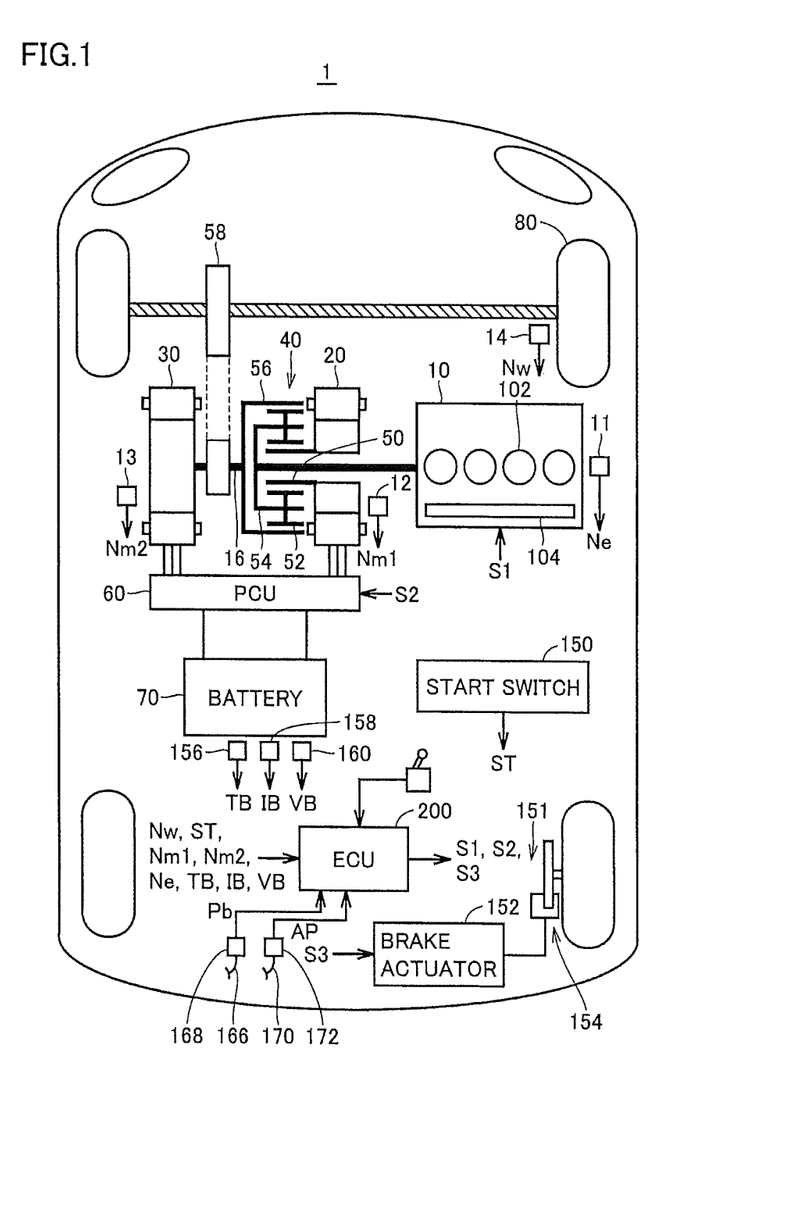
FIG. 1 is an overall block diagram of a vehicle according to the present embodiment.

Though vehicle 1 having drive wheel 80 as a front wheel has been shown by way of example in FIG. 1, the vehicle is not particularly limited to such a drive system. For example, vehicle 1 may have a rear wheel as a drive wheel. Alternatively, vehicle 1 may be a vehicle not including second MG 30 in FIG. 1. Alternatively, vehicle 1 may be a vehicle in which second MG 30 in FIG. 1 is coupled to a drive shaft for driving a rear wheel instead of drive shaft 16 of a front wheel. In addition, a speed change mechanism may be provided between drive shaft 16 and reduction gear 58 or between drive shaft 16 and second MG 30.

Figure 9:
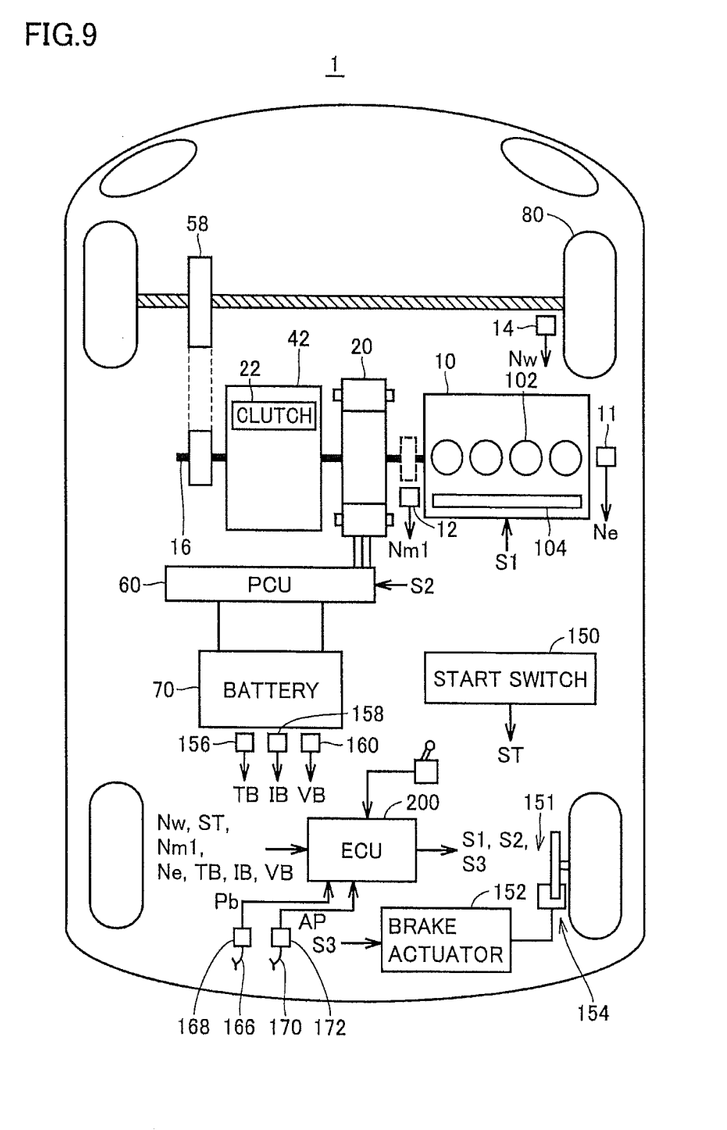
FIG. 9 is a diagram showing another construction example of a vehicle.

Alternatively, vehicle 1 may have a construction as shown in FIG. 9. Specifically, vehicle 1 shown in FIG. 9 is different in construction from vehicle 1 in FIG. 1 in that second MG 30 is not provided, the rotation shaft of first MG 20 is coupled to the output shaft of engine 10, and a power transmission device 42 having a clutch 22 is included instead of power split device 40. Clutch 22 varies first MG 20 and drive wheel 80 between a power transmission state and a power cut-off state. Power transmission device 42 is implemented, for example, by a speed change mechanism. It is noted that an additional clutch (a dashed line in FIG. 9) may be provided between engine 10 and first MG 20, in addition to clutch 22.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

1 vehicle; 10 engine; 11 engine rotation speed sensor; 12 first resolver; 13 second resolver; 14 wheel speed sensor; 16 drive shaft; 40 power split device; 50 sun gear; 52 pinion gear; 54 carrier; 56 ring gear; 58 reduction gear; 60 PCU; 70 battery; 80 drive wheel; 102 cylinder; 104 fuel injector; 155 start switch; 151 braking device; 152 brake actuator; 154 disk brake; 156 battery temperature sensor; 158 current sensor; 160 voltage sensor; 166 brake pedal; 168 brake pedal pressing force sensor; 170 accelerator pedal; 172 pedal stroke sensor; 200 ECU; 202 first pressing-down determination unit; 204 first counter processing unit; 206 amount-of-change-in-pressing-force calculation unit; 208 release determination unit; 210 first motoring processing unit; 212 second counter processing unit; 214 second pressing-down determination unit; 216 amount-of-change-in-stroke calculation unit; and 218 second motoring processing unit

The invention claimed is:

1. A vehicle, comprising:
an internal combustion engine serving as a drive source of a vehicle;
a rotating electric machine for rotating an output shaft of said internal combustion engine; and
a control unit for controlling said rotating electric machine so as to increase the number of revolutions of said internal combustion engine based on a velocity of said vehicle, while said vehicle is not driven, wherein
while said vehicle is not driven, as at least any one of a speed of pressing-down of an accelerator pedal and a speed of switching from a brake pedal to said accelerator pedal is higher, said control unit increases a rate of increase in said number of revolutions, as compared with a rate of increase when the speed is low, and said control unit determines a target value of said number of revolutions such that, as deceleration of said vehicle is higher, the number of revolutions of said internal combustion engine increased by said rotating electric machine becomes great, as compared with the number of revolutions when deceleration is low.

2. The vehicle according to claim 1, wherein
said control unit controls said rotating electric machine such that said number of revolutions increases to said target value when said brake pedal is released.

3. The vehicle according to claim 1, further comprising:
a drive shaft for rotating a drive wheel; and
a power transmission device capable of transmitting, by mechanically coupling three elements of said drive shaft, an output shaft of said internal combustion engine, and a rotation shaft of said rotating electric machine and setting any one of said three elements as a reaction force element, motive power between two other elements.

4. The vehicle according to claim 3, wherein
said power transmission device is a planetary gear mechanism having a sun gear, a pinion gear, a carrier, and a ring gear,
said sun gear is coupled to said rotation shaft of said rotating electric machine,
said carrier is coupled to said output shaft of said internal combustion engine, and
said ring gear is coupled to said drive shaft.

5. The vehicle according to claim 1, further comprising a power transmission device coupled between said rotating electric machine and a drive wheel, wherein
said power transmission device includes a clutch for switching a state between said rotating electric machine and said drive wheel between a power transmission state and a power cut-off state.

6. A vehicle control method used for a vehicle incorporating an internal combustion engine serving as a drive source and a rotating electric machine for rotating an output shaft of said internal combustion engine, comprising the steps of:

while said vehicle is not driven, increasing a rate of increase in the number of revolutions of said internal combustion engine as at least any one of a speed of pressing-down of an accelerator pedal and a speed of switching from a brake pedal to said accelerator pedal is higher, as compared with a rate of increase when the speed is low;

determining a target value of said number of revolutions such that, as deceleration of said vehicle is higher, the number of revolutions of said internal combustion engine increased by said rotating electric machine becomes great, as compared with the number of revolutions when deceleration is low; and controlling said rotating electric machine such that the number of revolutions of said internal combustion engine increases based on said rate of increase and said target value.

\* \* \* \* \*